Figure 6:
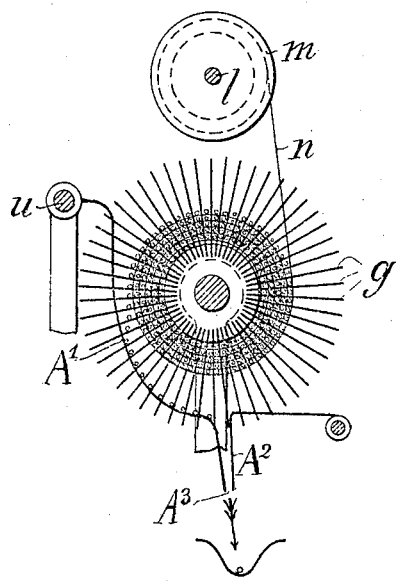

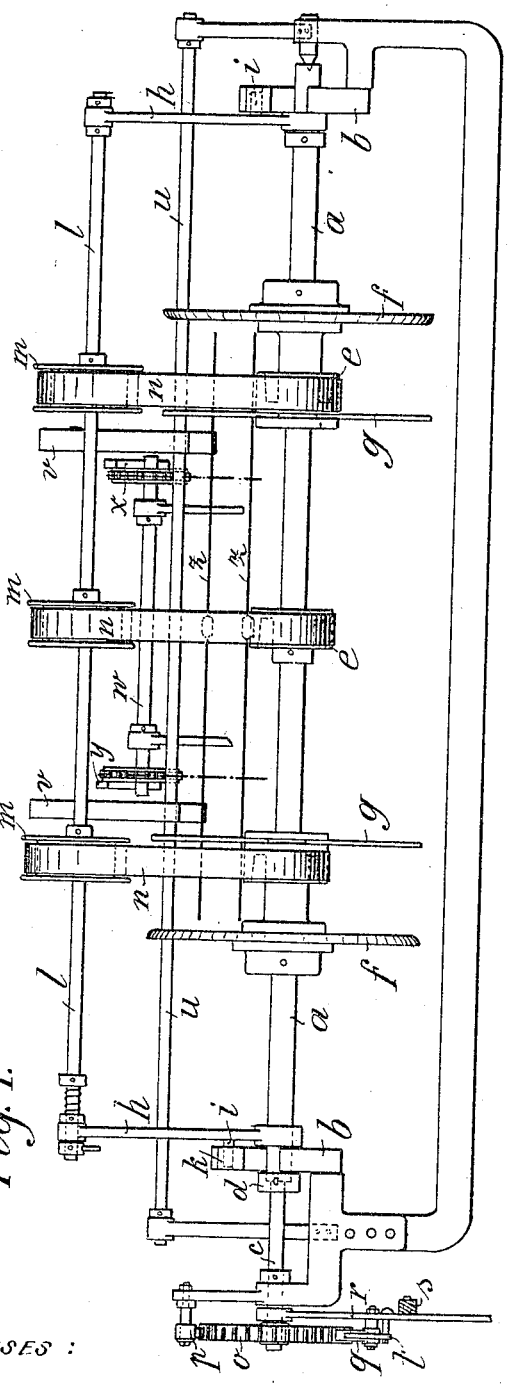

No. 812,076. PATENTED FEB. 6, 1906.
E. NEUMANN.
TRANSFER APPARATUS FOR WIRE HEDDLES.
APPLICATION FILED NOV. 9, 1903.
3 SHEETS—SHEET 2.
*Fig. 3.*
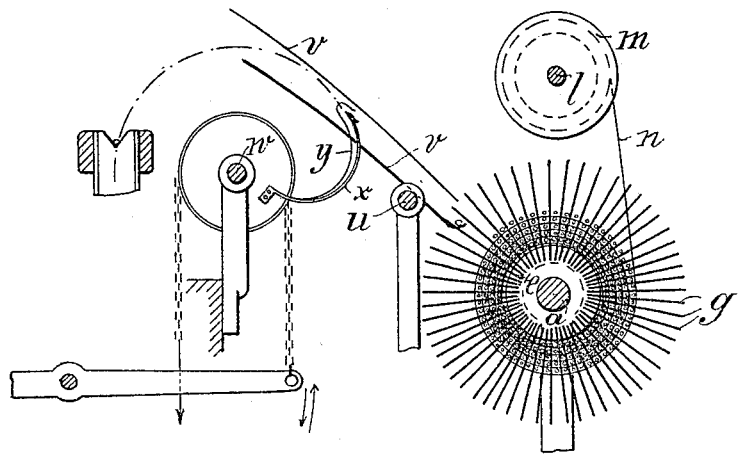
*Fig. 4* *Fig. 5.*
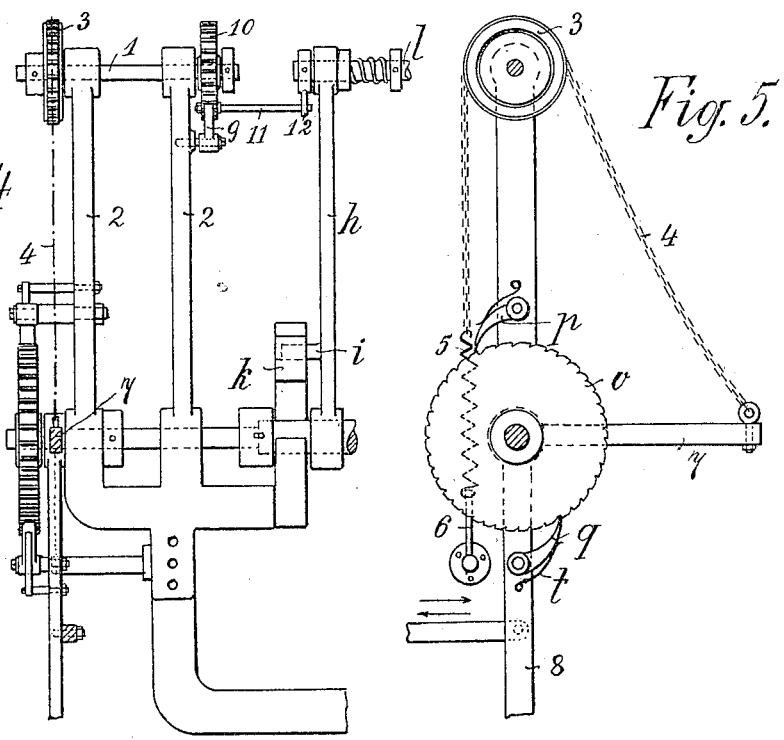
WITNESSES:
W. M. Avery
C. R. Ferguson
INVENTOR
Engelbert Neumann
BY
ATTORNEYS.

No. 812,076. PATENTED FEB. 6, 1906.
E. NEUMANN.
TRANSFER APPARATUS FOR WIRE HEDDLES.
APPLICATION FILED NOV. 9, 1903.

WITNESSES:
W. M. Avery
C. R. Ferguson

INVENTOR
Engelbert Neumann
BY
ATTORNEYS.

UNITED STATES PATENT OFFICE.

ENGELBERT NEUMANN, OF CREFELD, GERMANY, ASSIGNOR OF ONE-HALF TO THE FIRM OF A. WEYERS & CIE., OF CREFELD, PRUSSIA, GERMANY, DOING BUSINESS UNDER THE LAWS OF THE GERMAN EMPIRE.

TRANSFER APPARATUS FOR WIRE HEDDLES.

No. 812,076.     Specification of Letters Patent.     Patented Feb. 6, 1906.

Application filed November 9, 1903. Serial No. 180,394.

*To all whom it may concern:*

Be it known that I, ENGELBERT NEUMANN, machine constructor, a subject of the Emperor of Austria-Hungary, residing at Crefeld, Rhenish Prussia, German Empire, have invented a certain new and useful Automatic Transfer Apparatus for Wire Heddles and the Like, of which the following is a specification.

This invention has reference to a novel automatic apparatus for receiving and holding in position and also for discharging the pieces of wire in the manufacture of wire heddles, and the apparatus is particularly intended for use in combination with heddle-making machines, and especially for that kind of machines in which the several steps of forming the central eye and the end eyes of the heddles are carried on automatically, but in separate stages. The apparatus is also intended to be used in combination with or attached to almost any kind of automatic heddle-making machine for receiving the wire heddles when formed and for subsequently automatically discharging or feeding these heddles into an automatic soldering-machine, which soldering-machine performs the soldering or tin-coating of the central eye and of the ends of the wire heddles to make them smooth and more durable in a manner which is known in the arts. While these operations or stages of operations are carried on automatically, it was, however, heretofore necessary to effect the putting in position of the separate heddles by hand for the subsequent operation, so that these transfer operations from machine to machine did again consume an expenditure of time and help.

I have devised an apparatus into which the heddle-strands after an operation which comprises the cutting to the desired length of wire and also the formation of the central eye or of the so-called "mail" are fed automatically in succession and held in such a manner that after the apparatus is filled the same will also serve for the automatic discharge and feeding of the separate heddle-strands for the next operation in another machine where the end eyes are formed, and here again another identical apparatus is applied to receive and transfer the completely-formed wire heddles to the soldering-machine, as above mentioned. When one apparatus has been filled with wire heddles, it is taken off and replaced by an empty one, and so on in succession, and when the apparatus is transferred for discharging and emptied the empty apparatus is at once replaced by a filled one for the continuous operation of the different machines.

The apparatus as described is to be employed in combination with the different pieces of machinery for the automatic manufacture of wire heddles. It is understood, however, that the apparatus may also be employed wherever other objects of any similar nature are to be shaped or worked by means of different and separate processes which cannot be carried out in one and the same place or operation.

Figure 1 is a front view of that part of the apparatus for receiving the heddles from the heddle-making machine. Fig. 2 is a detail sectional view showing the main shaft, one of its journals, and one of the standards on said shaft. Fig. 3 is a detail side view, partly in section, showing a part of the apparatus. Fig. 4 is a front view, on an enlarged scale, of the actuating mechanism of the apparatus employed for paying out the heddles individually from the receiving apparatus. Fig. 5 is an end view, partly in section, of the same; and Fig. 6 is a detail sectional view showing the feeder in the discharging operation.

In Figs. 1 and 3 of the accompanying drawings the apparatus is shown as receiver and connected with an actuating mechanism which is so constructed that, for instance, in the heddle-making machine where the central eye is made the heddle is automatically taken by the heddle-making machine from the former and deposited into the receiver.

In Fig. 6 of the drawings the apparatus is shown as a feeder in the discharging operation. Here the action of the actuating mechanism is the reverse of that of the receiver. On the machine into which the heddles or objects are discharged there are arranged two or more retainers A', made of wire or some other material, which retainers present a curved-shaped part toward the apparatus. The retainers engage between its projecting rods the heddles or objects which fall by gravity from the apparatus against the curved part of the retainers A' and are thus retained and are still under the control of the rods of the apparatus until they come one by one to the open guide A³ with a holdback A², which makes the heddles go singly and in succession to the machine to be fed.

Referring to Figs. 1, 2, and 3 of the drawings, $a$ is the shaft of the transfer apparatus, said shaft resting so as to be freely rotatable and removable in journals $b$, which are open at the top. At the side of one, preferably the left-hand one, of the journals there is also an extension $c$ of the shaft, which is coupled with the piece $a$ by the part $d$ and which serves to transmit the movement upon the shaft $a$. Upon this shaft $a$ there are arranged several supporting-rollers $e$ at a distance from each other and next to those two retaining-disks $f$ are mounted, which serve to secure the heddles supported on the rollers in position and against lateral displacement. The exterior rollers $e$ are provided with a fitting of rods or pins $g$, extending radially from the shaft-center or with equivalent means, so as to form a kind of star-shaped receiving apparatus, the arrangement being such that in the operation of putting the heddles in position one heddle each is always placed into one of the spaces formed by the respective pins. Upon the shaft $a$ are loosely mounted standards $h$, which are locked against tilting by laterally-arranged lugs $i$, engaging with upwardly-extending projections $k$ of the journals of the shaft, Fig. 2. These standards $h$ support a shaft $l$, upon which counter-rollers $m$ are arranged exactly opposite the rollers $e$. The rollers $m$ and $e$ are connected by bands $n$, cords, or the like in such a manner that upon unwinding the parts $n$ from the upper rollers they will wind up upon the lower rollers and also inversely. Upon the extremity of the one-sided extension $c$ of the shaft $a$ is mounted a ratchet-wheel $o$, provided with ratchet and checking pawls $p$ $q$, which are forced against the wheel by means of spring action and of which the upper one is suspended on the stationary frame while the lower ratchet pawl is fixed to the bell-crank $r$, which is loosely mounted upon the shaft $c$ and which is reciprocated and swung through an adjustable distance from the driving-shaft of the machine by means of a pitman $s$, during which movement the engagement and the operation of the pawl is secured by a spring $t$.

Upon the lateral supporting-journals of the shaft $a$ are mounted stationary brackets in which the shaft $u$ is journaled. Upon this shaft $u$ stationary guides $v$ are secured for the arriving heddles and the like which are to be conducted onto the transfer device. As an instance of a means for placing the heddles into the guides $v$ a shaft $w$, which receives an intermittent movement by means of a chain-drive, is arranged at the rear of the shaft $u$. Fingers of peculiar shape are fixed upon said shaft $w$ on the sides of the disks which hold the chain-drive, and these curved fingers $x$ are covered at their ends by movable elastic springs in the shape of arrow-point bent hooks $y$, by means of which the heddles can be fetched from the dies in which they are being subjected to the first treatment. This arrangement operates as follows: By means of the driving mechanism of the machine the fingers $xy$ are swung mechanically to the left, Fig. 3, and while the heddle $z$ is still being held by its dies in operative position the elastic arrow-pointed curved springs $y$ slide under the heddle, so that upon the subsequent return movement of the fingers the hooked ends thereof carry the heddle along and it is thrown off to the right-hand side and placed between the guides $v$. The heddles will then roll one by one between the guides $v$ and are thus fed into the transfer device, where they will be compelled to drop into one of the receptive spaces formed by the radial rods. Upon each movement of the heddle-feeding device the pitman-actuating cam will displace the pitman $s$ for the predetermined distance, so that the pawl-feeding apparatus $o$ $r$, which is mounted upon the shaft $c$, is fed forward by the pawl $q$ for a certain distance, which is sufficient to allow the respective rotation of the shaft $a$ to correspond upon the graduated scale to the exact distance of the center of each compartment from the center of the next compartment. The insertion of every new heddle is followed by such a rotation of the star-shaped frames that each succeeding heddle drops into the next following compartment. When the shaft is thus rotated, the bands $n$ are wound up more and more upon the rollers of shaft $a$ and are correspondingly unwound from the rollers $m$, which are mounted on the upper shaft $l$, while the tension-spring on this shaft counteracts the winding off to such an extent that only a sufficient length of ribbon is wound off which can be taken up by the rollers mounted upon $e$. Each layer of the heddles deposited upon the rollers $e$ is therefore gradually covered up by the bands, (see Fig. 3,) and it is therefore completely separated from the next layer, so that the subsequent discharging of the several heddles from the apparatus can also be effected without difficulty.

In order to carry out the automatic discharging operation of the heddles from a filled transfer apparatus, the entire apparatus is lifted clear out of its journals on shaft $a$ after the release of the coupling $d$ and after the loosening of the pin on the other end of the shaft, and the entire apparatus is then reinserted into the corresponding journals of the other machine, in which the heddles or the like are to be paid out one by one for further treatment. For this purpose it becomes necessary to automatically release the bands and the like $n$, which cover the layers of the goods, while the shaft $a$ is correspondingly revolved. These bands must, however, be immediately wound up taut upon the upper rollers $m$, inasmuch as otherwise the separate feeding cannot be regularly effected. In order to attain this object, a special moving device for the shaft of the upper-belt rollers is arranged only for the paying out or feeding device upon the part of the apparatus shown at the left-hand side of the drawings and which is provided with the shaft $c$ and with the pawl-feeding device. This device is shown in Figs. 4, 5, and 6.

Upon the frame intended for the lower pawl-feeding mechanism stays 2 are rigidly attached to the frame and serve for the support of a counter-shaft 1 to be provided in line with the shaft $l$ and corresponding to the shaft-piece $c$.

Upon the outer end of the shaft 1 a free wheel 3 is arranged, the sprocket-chain 4 of which is connected on the rear side to the tension-spring 5. The spring is fastened at its lower end to the frame of the machine. The front end of the chain 4 is operatively connected to the outer end of the upper arm 7 of a bell-crank lever mounted upon the shaft $c$ and the other downwardly-extending arm of which is provided with the lower ratchet-pawl belonging to the ratchet-wheel $o$. This arm 8 is given a reciprocating movement by a pitman $s$ entirely in the same manner as with the apparatus represented in Fig. 1 for the filling process, the reciprocating movement in this case, however, revolving the shaft $a$ for the value of the distance from each other of the compartments of the star-wheels and in the direction corresponding to the discharging operation. Upon the end of the shaft 1 opposite to the shaft $l$ a ratchet-wheel 10, with ratchet-pawl 9, is mounted upon the shaft 1, and a rod or knuckle 11 is also fastened to the shaft and acts upon a stop 12 at the end of the shaft $l$. The portions of the bands which become released should be prevented from hanging loose and must be rewound tight upon the rollers of the upper shaft, which is done by the action of the mechanism described and by the assistance of the free wheel. During every oscillation of the bell-crank lever 7 8 effected by the machine and while the ratchet is moved forward tension is imparted to the spring 5 by the advancing of the sprocket-chain 4 of the free wheel. No motion, however, is imparted to the shaft 1, inasmuch as during this time the shaft $l$ is prevented from moving by the action of the ratchet-pawl 9 upon the ratchet-wheel 10. If then upon the return movement of the bell-crank lever 7 8 a length of band becomes released from the shaft which is turned for the purpose of discharging the pieces, the said length of band is immediately wound up upon the upper rollers, because the charged spring 5 will now withdraw the sprocket-chain whereby the shaft 1 rotates the shaft $l$ also in the direction of the winding up of the bands by means of the sprocket-wheel and by the action of the rod 11 and stop 12 until the tension of the ribbons between both roller systems balances the spring tension, the ribbons being thus always kept under tension.

What I claim as new, and desire to secure by Letters Patent of the United States, is—

1. In an automatic transfer apparatus for wire heddles and the like, the combination of a shaft with rollers or drums fastened to it on the periphery of which compartments of equal capacity are formed by a series of radially-arranged rods or equivalent means and bands or cords fastened by one end to these drums, which bands wind around the layers of heddles and hold them in place, substantially as described.

2. In an automatic transfer apparatus for wire heddles and the like, the combination of a shaft with drums, radially-arranged rods and ribbons fastened to these drums and placed upon upright arms at a certain distance from the main shaft, a counter-shaft with an equal number of drums to which the other end of the ribbons is fastened and so arranged that the ribbons on the drums of one of the shafts can unwind when the other shaft winds up, substantially as described.

3. In an automatic transfer apparatus for wire heddles and the like, the combination of the main shaft being detachably coupled to a stationary driving-shaft on which latter a ratchet-pawl mechanism is mounted, the feeding distance of which is equal to the division in compartments of the drums by the radially-arranged rods, substantially as described.

4. In automatic transfer apparatus for heddles or the like, the combination of a stationary horizontal shaft, a detachable shaft in line with and coupled to said stationary shaft, compartment wheels or drums on said detachable shaft, means on said stationary shaft for imparting intermittent movement to said shaft, a supporting-frame for both shafts, an upwardly-extending open-eyed journal secured to said frame and in which the detachable shaft is journaled, and a lateral extension out of line with said shaft and loosely mounted thereon and engaging with said journal for securing the shaft in position.

5. In an automatic transfer apparatus for wire heddles and the like, the combination of a second stationary shaft being placed at a distance above the stationary driving-shaft in line with and detachably connected to the counter-shaft of the apparatus, means for actuating the same by a bell-crank lever on the main shaft, a free wheel mounted on the second shaft, and a link chain running over the sprocket of the free wheel, held at one end by the bell-crank and at the other end by a stationary spring, and another common ratchet and stop on the second shaft for fixing the motions thus imparted, substantially as described.

6. The combination of an automatic transfer apparatus for wire heddles and the like, being connected with a wire-heddle machine or the like in a position for receiving, means for actuating the same and stationary open guides placed in an inclined position toward the transfer apparatus, guiding the objects coming from the machine into the compartments of apparatus as these are successively presented in rotation, substantially as described.

7. In an automatic transfer apparatus for wire heddles and the like, the combination of the main shaft, compartment-drums on the shaft, and two disks placed outside of the end drums on the main shaft, substantially as described.

8. In an automatic transfer apparatus for wire heddles and the like, the combination of drums with bands placed on its main and counter shafts, and a spiral spring compressible between one bearing and an adjustable collar on the counter-shaft for imparting friction and thus keeping the bands taut, substantially as described.

9. In automatic transfer apparatus for wire heddles or the like, the combination with the heddle-making machine and the like, of intermittently-rotatable compartment-wheels, curved elastic arrow-pointed fingers intermediate between said heddle-making machine and said compartment-wheels, and means for imparting a rocking semicircular movement to said fingers.

10. The combination of an automatic transfer apparatus for wire heddles and the like, being attached to or connected with a heddle-making machine in a position for feeding or discharging, means for actuating the same, and two or more stationary curved rods directed toward the main shaft of the apparatus between the radial rods, which arrest the heddles falling from the apparatus, so that the radial rods still control their movements, and open straight guides at the lower end of the curved rods by which the heddles pass one by one to the machine, substantially as described.

11. In an apparatus for the purpose specified, a shaft, rods extended radially from the shaft and forming walls of a plurality of compartments, and binding-bands attached to the shaft.

12. In an apparatus of the class described, the combination with a shaft, of a plurality of rods extended radially therefrom, a counter-shaft, and binding-bands engaged to wind around heddles on the first-named shaft, the said bands being given off from the counter-shaft.

13. In an apparatus for the purpose described, a shaft, a plurality of rods extended radially therefrom, means for placing heddles between the rods, and binding-bands for the heddles.

14. In an apparatus for the purpose described, a shaft, a plurality of rods extended from the shaft, guides for directing heddles between the rods, and devices for transferring heddle-wires to positions between the rods.

15. In an apparatus for the purpose specified, a shaft, rods extended radially therefrom, a rotary part, curved fingers carried by said rotary part and having curved resilient ends, and binding-bands secured at one end to the said shaft.

In witness whereof I have hereunto signed my name in the presence of two subscribing witnesses.

ENGELBERT NEUMANN.

Witnesses:
ARPENT WEYERS,
CARL SCHMITTER.